US012707539B2

(12) United States Patent
Homsi et al.

(10) Patent No.: US 12,707,539 B2
(45) Date of Patent: Aug. 11, 2026

(54) METHOD AND APPARATUS FOR DIMMING LIGHTING FIXTURES

(71) Applicant: KORRUS, INC., Los Angeles, CA (US)

(72) Inventors: Mustafa Homsi, Los Angeles, CA (US); Anthony N. McDougle, San Francisco, CA (US); Andrew Stangeland, Los Angeles, CA (US); Pujitha Prathipati, Van Nuys, CA (US); Timothy Jay Scott Rogerson, Los Angeles, CA (US)

(73) Assignee: KORRUS, INC., Anaheim, CA (US)

( * ) Notice: Subject to any disclaimer, the term of this patent is extended or adjusted under 35 U.S.C. 154(b) by 0 days.

(21) Appl. No.: 18/673,118

(22) Filed: May 23, 2024

(65) Prior Publication Data

US 2024/0397593 A1 Nov. 28, 2024

Related U.S. Application Data

(60) Provisional application No. 63/468,376, filed on May 23, 2023.

(51) Int. Cl.
*H05B 45/10* (2020.01)
*H05B 45/325* (2020.01)

(52) U.S. Cl.
CPC ........... *H05B 45/10* (2020.01); *H05B 45/325* (2020.01)

(58) Field of Classification Search
CPC .. H05B 45/10; H05B 45/325; H05B 45/3725; H05B 45/59
See application file for complete search history.

(56) References Cited

U.S. PATENT DOCUMENTS

| | | | | |
|---|---|---|---|---|
| 2012/0194079 A1* | 8/2012 | Clauberg | H05B 45/10 | 315/125 |
| 2013/0038234 A1* | 2/2013 | Van Der Veen | H05B 45/48 | 315/224 |
| 2020/0404755 A1* | 12/2020 | Eum | H05B 45/38 | |
| 2023/0123235 A1* | 4/2023 | Gritti | H05B 45/10 | 315/186 |

OTHER PUBLICATIONS

ANA4539 Application note, HRTIM cookbook, Jan. 2020, retrieved from <<https://www.st.com/resource/en/application_note/an4539-hrtim-cookbook-stmicroelectronics.pdf>>.
International Rectifier, Application Note AN-1214, LED Buck Converter Design Using the IRS2025L by Ektoras Bakalakos, Jan. 2015, retrieved from << https://www.infineon.com/dgdl/an-1214.pdf?fileId=5546d462533600a40153559e69531173>>.
RM0440 Reference Manual, Rev Mar. 9, 2025, STM32G4 series advanced Arm-based 32-bit MCUs, retrieved from <<https://www.st.com/resource/en/reference_manual/rm0440-stm32g4-series-advanced-armbased-32bit-mcus-stmicroelectronics.pdf>>.
ST, STM32H7-HRTIM, High-Resolution Timer, Revision 1.0, product training guide, retrieved from <<https://www.st.com/content/ccc/resource/training/technical/product_training/group0/c5/2b/46/23/2f/f2/47/ca/STM32H7-WDG_TIMERS-High_Resolution_Timer_HRTIM/files/STM32H7-WDG_TIMERS-High_Resolution_Timer_HRTIM.pdf/_jcr_content/translations/en.STM32H7-WDG_TIMERS-High_Resolution_Timer_HRTIM.pdf>>.

* cited by examiner

*Primary Examiner* — Raymond R Chai
(74) *Attorney, Agent, or Firm* — FisherBroyles LLP

(57) ABSTRACT

This disclosure pertains to methods, apparatus, circuitry, and techniques for controlling the dimming of lighting fixtures with precision and, particularly, down to very low levels of illumination.

20 Claims, 8 Drawing Sheets

Prior Art

METHOD AND APPARATUS FOR DIMMING LIGHTING FIXTURES

CROSS REFERENCE TO RELATED APPLICATION

This application claims the benefit of U.S. Provisional Application No. 63/468,376 filed May 23, 2023, the contents of which are incorporated by reference herein in their entirety as if fully set forth herein.

FIELD OF THE INVENTION

This disclosure pertains to methods, apparatus, circuitry, and techniques for controlling the dimming of lighting fixtures with precision and, particularly, down to very low levels of illumination.

BACKGROUND

Many lighting devices are dimmable, allowing the user to adjust the amount of illumination provided by the light. There are many types of lighting devices available on the market today that are capable of providing a variable level of illumination (i.e., are dimmable). These include old fashioned incandescent lights as well as LED (Light Emitting Diode) lights. Several techniques are known for controlling the dimming of lights. Two of the more common techniques are analog dimming and Pulse Width Modulation (PWM) dimming.

The brightness of an LED is generally proportional to the average current through the LED. In analog dimming, the brightness of a lighting device is controlled by controlling the amplitude of the current supplied to the light. A lower amplitude current will generally cause a dimmable light to emit less light and vice versa. However, analog dimming is not very precise. In addition, as the illumination becomes very low with analog dimming, LEDS tend to change color, which is generally undesirable.

In PWM dimming, current is transmitted through the lighting device in pulses. Thus, by changing the duty cycle (i.e., ON time versus OFF time during each cycle) of the current pulses, one can change the brightness of the illumination from the lighting device. Thus, as illustrated by the amplitude versus time graph of FIG. 1A, one may achieve full brightness (100%) by maintaining the current through the LED at a designated amplitude constantly (i.e., 100% duty cycle). If, instead the current is pulsed at a 50% duty cycle at the designated amplitude (on half the time and off half the time) as illustrated in FIG. 1B, the LED will illuminate at 50% brightness. Finally, as illustrated in FIG. 1C, if, for each cycle, c, the current is on 25% of the time and off 75% of the time, the LED will appear to be at 25% of the full brightness.

However, PWM dimming also has certain drawbacks. For instance, at very low levels of illumination, e.g., below 0.1% of full power, light quality shortcomings, particularly flicker, may become apparent to the naked eye.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION

In the following detailed description, numerous specific details are set forth to provide a thorough understanding of embodiments and/or examples disclosed herein.

However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly, and/or inherently (collectively "provided") herein.

It is desirable to be able to control dimming of LED and other lighting devices from 100% (full brightness) down to 0.01% brightness linearly and with high precision. However, getting down to 0.01% brightness is very difficult using either PWM dimming or analog dimming due at least in part to some of the shortcomings of those technologies mentioned above.

Figures 1A, 1B, 1C:
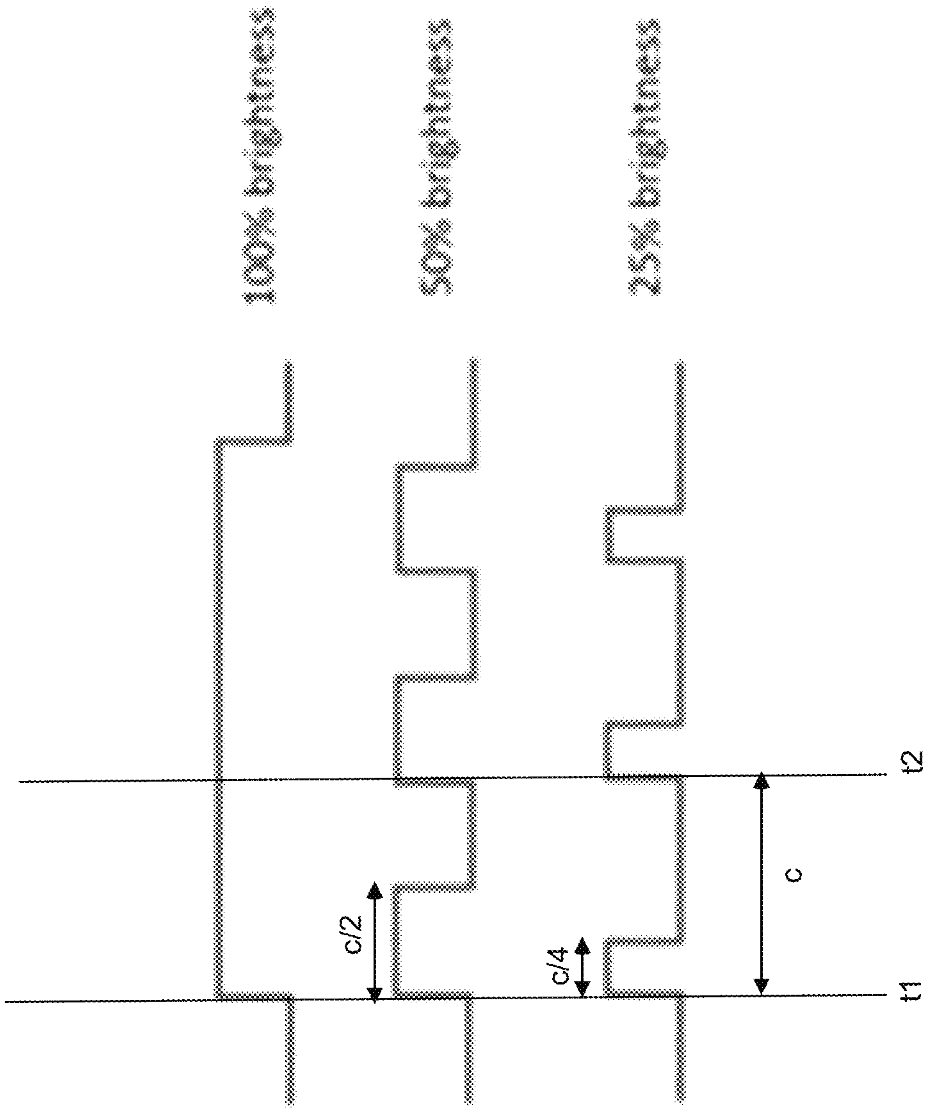
FIGS. 1A. 1B, and 1C are graphs illustrating PWM dimming at various current pulse duty cycles.
Figure 2:
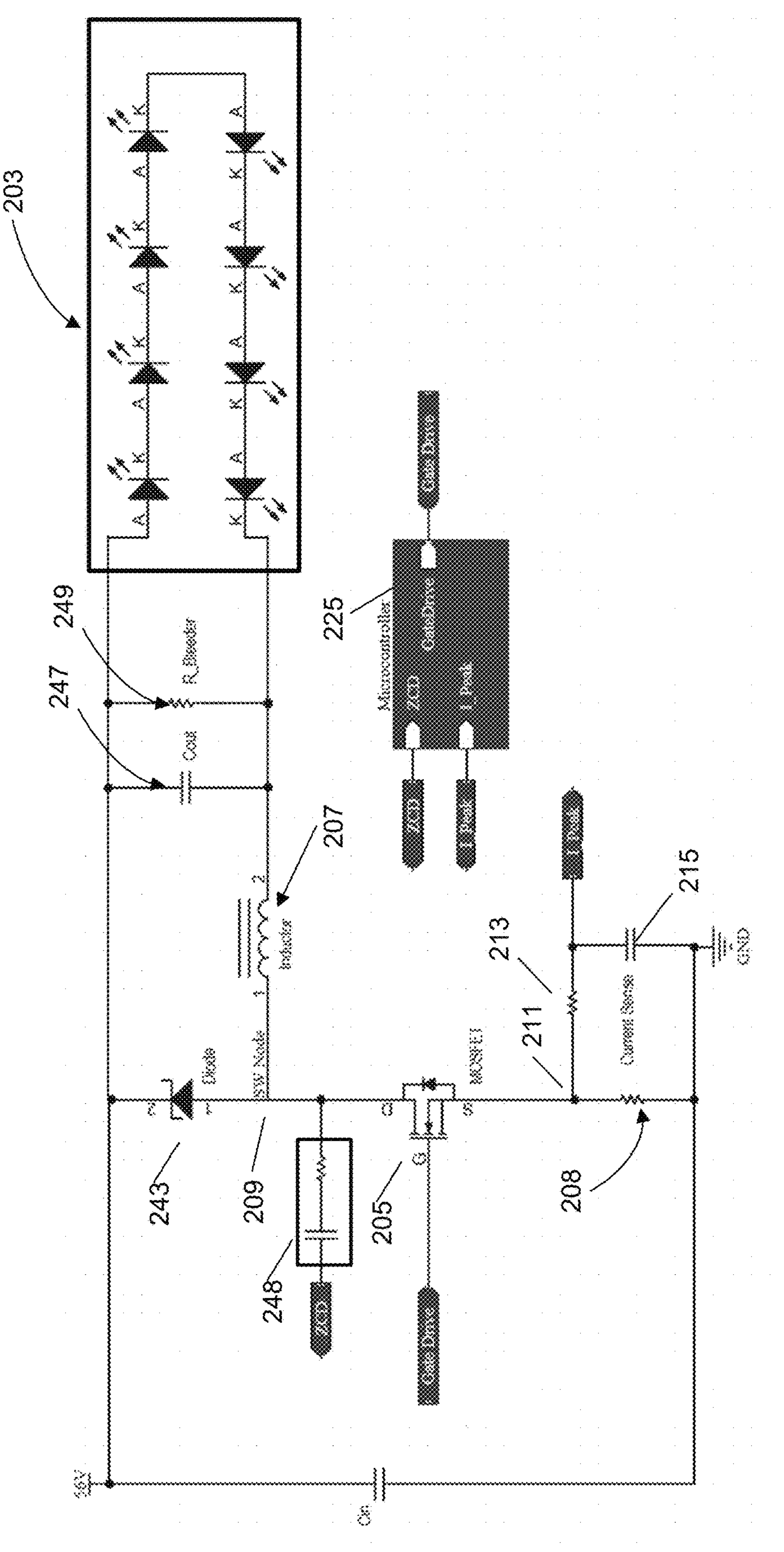
FIG. 2 is circuit diagram of a dimming circuit in accordance with embodiments.

FIG. 2 is a circuit diagram illustrating circuitry for controlling dimming of a lighting device that is capable of very precisely controlling illumination level down to about 0.01% of full power/illumination and with very high resolution (e.g., up to 65,536 distinct dimming levels between 0.01% and 100%) in accordance with an embodiment.

The circuit accomplishes this using a combination of an analog dimming technique and two different types of PWM dimming techniques. In accordance with the first PWM dimming technique, herein termed "PWM duty cycle control dimming", the duty cycle (i.e., on/off ratio per cycle) is controlled to adjust dimming. In accordance with the second PWM dimming technique, herein termed "PWM frequency control dimming", the duration of a PWM cycle is controlled to further adjust dimming, e.g., increasing the period of a cycle (i.e., decreasing the switching frequency) to adjust dimming to lower levels.

As will be explained in detail below, in operation, by combining these three techniques, dimming can be very precisely controlled down to extremely low levels of illumination (about 0.01%) while avoiding the pitfalls of prior art dimming systems, such as flicker and color change.

Analog Dimming Technique

In FIG. 2, the lighting device (or string of devices, such as a string of LED lights) is represented at 203. As previously noted, the brightness (i.e., dimming level of the light 203 is proportional to the average current through the light. The MOSFET transistor 205 is the circuit component that most directly controls the dimming level of (or average current through) the light 203. The gate terminal of the MOSFET 205 is coupled to a control output terminal of a microprocessor 225 that is programmed to turn the MOSFET on and off at determined intervals in order to control the current through the light 203, and thus the dimming level of the light, as will be described in detail herein. The drain terminal of the MOSFET is coupled to a node 209, which is also coupled, inter alia, to an inductor 207. This node 209 between the inductor and the drain terminal of the MOSFET 205 is herein termed the switching node. The other end of the inductor 207 is coupled to one end terminal of the light 203. The other end terminal of the light is coupled to a voltage rail, in this example set at 56 volts.

The source terminal of MOSFET transistor 205 is coupled to one terminal of a sensing resistor $R_{sns}$ 208. The other end of resistor 208 is coupled to ground. The sensing resistor 208 will cause a certain voltage to appear at sensing node 211 that is dictated by the current out of the drain terminal of MOSFET 205. That sensing node 211 is coupled through an RC filter circuit comprising resistor 213 and capacitor 215 to a terminal herein referred to as I peak or $I_{PK}$. Terminal $I_{PK}$ is coupled to an input terminal of the microprocessor 225, the microprocessor being programmed to turn off MOSFET 205 (via the voltage it places at the gate terminal of the MOSFET 225), when the current at terminal $I_{PK}$ reaches a predetermined adjustable current level, herein termed $I_{PKset}$. As will be described in more detail below, $I_{PKset}$ is a setting by which the level of dimming achieved via the analog dimming technique will be controlled by the microprocessor. It may be adjusted anywhere between a maximum value, $I_{PKmax}$, and a minimum value, $I_{PKmin}$. $I_{PKmax}$ may be at or anywhere below the maximum current rating for the particular light string 203. $I_{PKmin}$ is the minimum current that can be set via the analog dimming technique and may be limited to a particular minimum value as a function of the Miller capacitance of the MOSFET 205, as will be discussed in more detail below.

The RC filter comprising resistor 213 and capacitor 215 is designed to filter out high frequency noise from the $I_{PK}$ terminal. In an embodiment, it may be set to filter out signals greater than 170 MHz.

Returning to switching terminal 209, it is also coupled (through another RC filter circuit 248 comprising resistor 217 and capacitor 219) to another input terminal of the microprocessor 225, herein termed terminal ZCD. Filter 248 is configured to filter out high frequency noise at the switching node 209. The microprocessor is programmed to implement a ZCD (Zero Crossing Detector) at terminal ZCD. Specifically, the microprocessor is programmed to output a voltage to the gate terminal of MOSFET 205 that will turn on the MOSFET (e.g., 3.3 volts or 5 volts) when it detects a zero crossing event (e.g., the voltage at switching terminal 209 is zero. Particularly, a voltage of zero at switching terminal 209 indicates that the current through the inductor 207 also is zero.

Thus, with the understanding as described above that the voltage at switching terminal 209 dictates when the microprocessor turns on MOSFET 205 and that the voltage at sensing terminal 211 dictates when the microprocessor turns off MOSFET 205, the analog dimming portion of the circuit operation will now be described in detail.

As can be seen from the circuit diagram of FIG. 2, the current through the inductor 207 is essentially proportional to the current through the LED string 203. When the microprocessor turns on MOSFET 205 (e.g., applies 3.3 Volts to the MOSFET's gate terminal), current can run through MOSFET 205 to ground through the sensing resistor 208. Due to the manner in which inductors operate, when MOSFET 205 first turns on, inductor 207 will initially resist current flow, but will allow current to ramp up over a short period of time until the inductor 207 essentially offers no resistance to current flow, at which point the current through the inductor (and thus sensing node 209) will be at a steady state. Thus, when MOSFET 205 first turns on, the current through the switching node 209 will ramp up as shown by plot 301 in FIG. 3 between times t0 and t1. Of course, if the transistor is allowed to remain on long enough, the inductor resistance will eventually go to zero such that the current through switching node 209 thereafter remain at a steady state current.

However, as previously noted, the microprocessor turns the MOSFET off (e.g., applies 0 volts at the MOSFET's gate terminal) when the voltage at sensing node 211 reaches the specified level, $I_{PK}$. Thus, by setting $I_{PK}$ to a value that is less than the steady state current, that steady state current level will never be reached.

Thus, when the current at sensing node 211 reaches $I_{PKset}$ at time t1, the microprocessor turns MOSFET 205 off. When the MOSFET 205 turns off, the current at node $I_{PK}$ will not stop immediately, but rather will ramp down over a short period of time as the capacitor 215 discharges, as illustrated between times t1 and t2 in FIG. 3.

Simultaneously, when the MOSFET 205 turns off, the current through the LED string 203 (and thus through the inductor 207) will also start to ramp down. More specifically, when MOSFET 205 turns off, the current through the inductor will not stop instantaneously, but will drop (substantially linearly) over a short period of time as the inductor 207 discharges (as this is the basic operation of an inductor). Since, when the MOSFET 205 is off, no current can run through the MOSFET, that current will instead run through the diode 243 until the current stops, at which point the voltage at the switching node 209 reaches zero. As previously noted, when the voltage at switching node 209 reaches zero, the ZCD function in the microprocessor will turn the MOSFET 205 back on.

Figure 3:
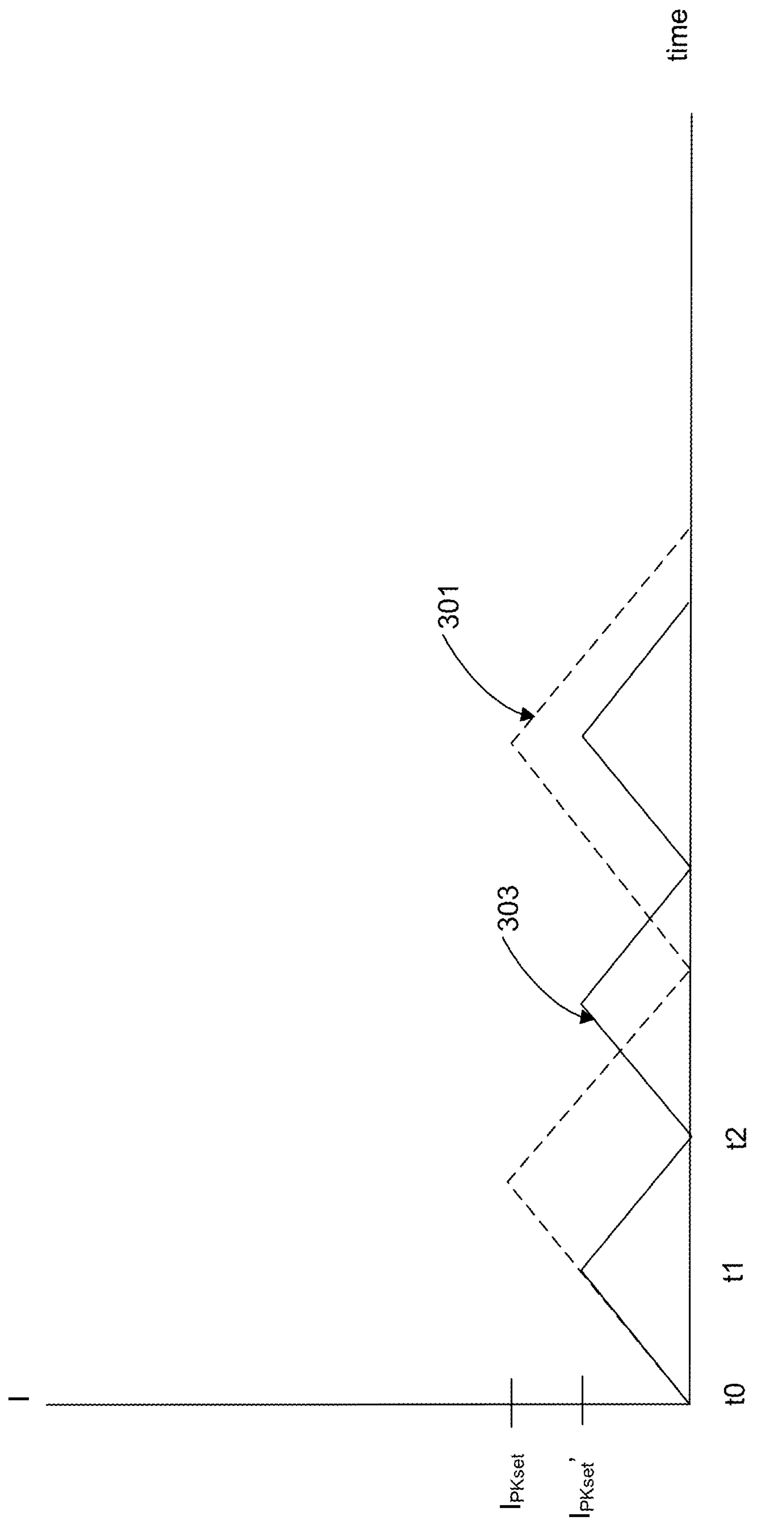
FIG. 3 is a graphical illustration of an exemplary current at node $I_{PK}$ in FIG. 2 in accordance with embodiments.

Accordingly, the current through the LED string has the triangular waveform 301 illustrated in FIG. 3. Capacitor 247, coupled in parallel with the LED string, acts as a filter (or integrator) for the LED string 203 so that the LED string simply receives the average current of the triangular waveform shown in FIG. 3 (i.e., the area under the triangular waveform curve 301 in FIG. 3).

The remaining circuitry shown in FIG. 2 is conventional and, therefore, will be described only briefly.

Diode 243 is free-wheeling diode that helps discharge the inductor current when the MOSFET 205 is turned off. Bleeder resistor 249 may be positioned in parallel with capacitor 247 to provide a load across the capacitor 247, which is conducive to its discharging. Finally, capacitor and resistor combination 248 is the circuitry that makes the zero crossing detection work as described above. Particularly, when the transistor 205 turns off, the current through the inductor 207 starts to drop, and, because the path through the transistor 205 is off (open circuited) when the transistor is off, the current through the inductor 207 instead runs through the diode 243 to the 56 Volt rail. Thus, the switching node 209 is pulled up to 56V. Thus, the ZCD node is charged up to a clamped voltage, e.g., clamped with a resistor divider circuit from a 5V line (not shown) so the highest voltage this node can go to is roughly 4.5.

Once the inductor current reaches zero, the diode 243 stops conducting. Thus, the switching node 209 is no longer pulled up to 56V. The ZCD node now immediately discharges to 0V through the RC circuit 248, which is the cue to the microprocessor to turn the MOSFET back ON, as previously described.

Thus, analog dimming is achieved by adjusting the value of $I_{PKset}$ at which the microprocessor will turn off the MOSFET 205 to a value that achieves the desired level of dimming via analog dimming technique.

Note that increasing the amplitude to which $I_{PKset}$ is set will increase the area under the curve in FIG. 3, thus increasing the average current through the LED string (i.e., making the light less dim), while decreasing the amplitude to which $I_{PKset}$ is set will decrease the are under the curve in FIG. 3, thereby reducing the average current through the LED string (i.e., making the light dimmer). Also note that, as the amplitude of $I_{PKset}$ is increased, it will take more time for the current to ramp up to $I_{PKset}$ as well as more time for the current to ramp down back to zero. Thus, the duration (or period) of each triangle will increase as $I_{PKset}$ increases. In other words, the wavelength of the triangular waveform will increase, which is the same as saying that the frequency of the triangular waveform will decrease. This is illustrated by the dashed plot 303 in FIG. 3, which shows that if $I_{PKset}$ is set to a higher amplitude, e.g., $I_{PKset}'$, the frequency of the triangular waveform decreases.

Figure 8:
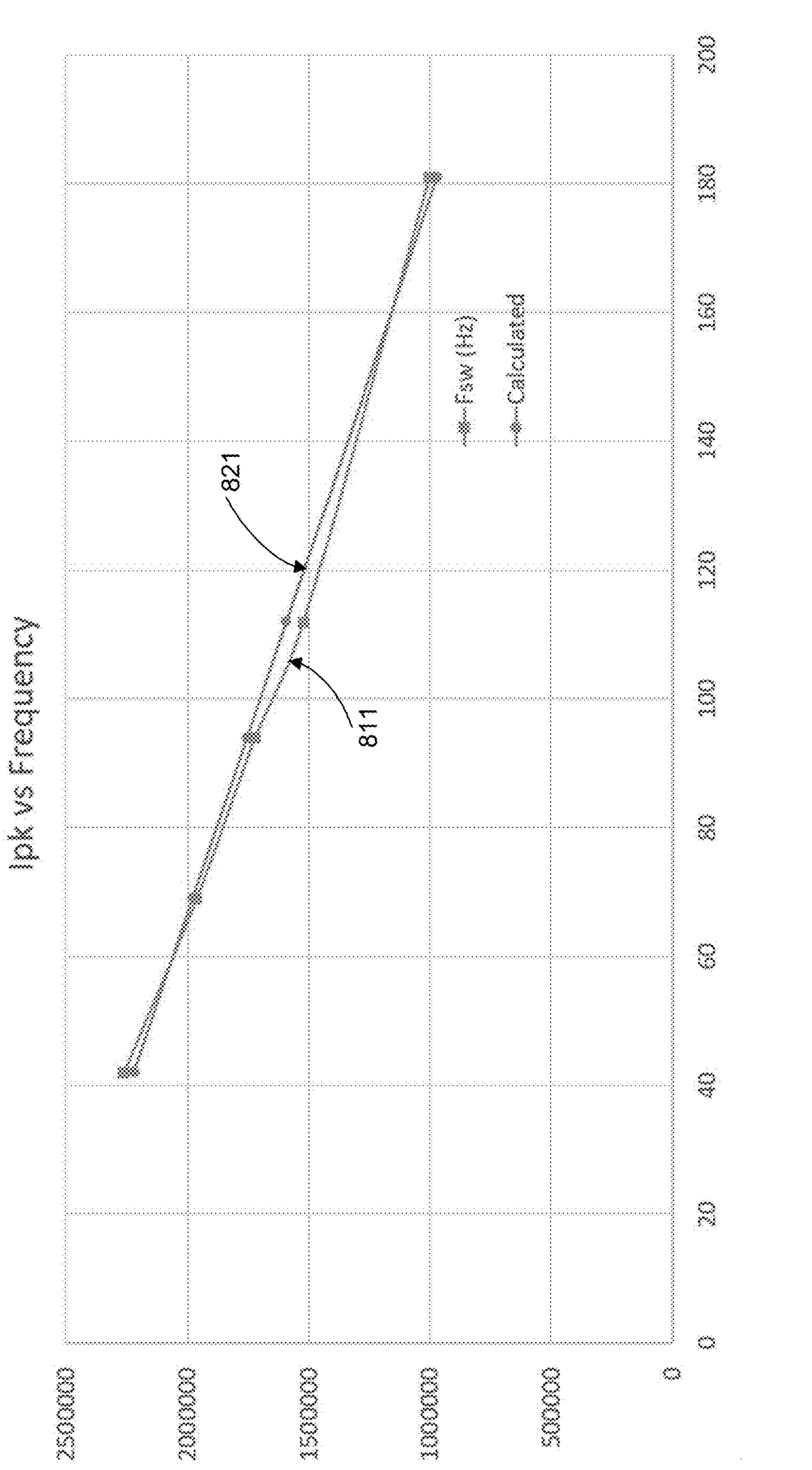
FIG. 8 is a graph illustrating a mapping of pulse frequency as a function of peak current in accordance with embodiments.

Obviously, the opposite also is true, i.e., as the amplitude of $I_{PKset}$ is decreased, it will take less time for the current to ramp up to $I_{PKset}$ as well as less time for the current to ramp down back to zero such that the frequency of the triangular waveform would increase. Thus, if the nominal switching frequency is, for example, set to 1 MHz when no dimming is applied, i.e., when $I_{PKset}$ is at its maximum value, then the actual switching frequency when some dimming is applied will be higher. This is illustrated in the graph of FIG. 8, which is discussed in detail further below, but which clearly shows that, when the circuit is configured to have a switching frequency of 1 MHz when no dimming is applied, i.e., when $I_{PKset}$ is at its maximum (180 mA in this case), then when $I_{PKset}$ is reduced to 40 mA, that switching frequency has increased by well over 100% to about 2.25 MHz.

PWM Duty Cycle Control Dimming Technique

Figure 4:
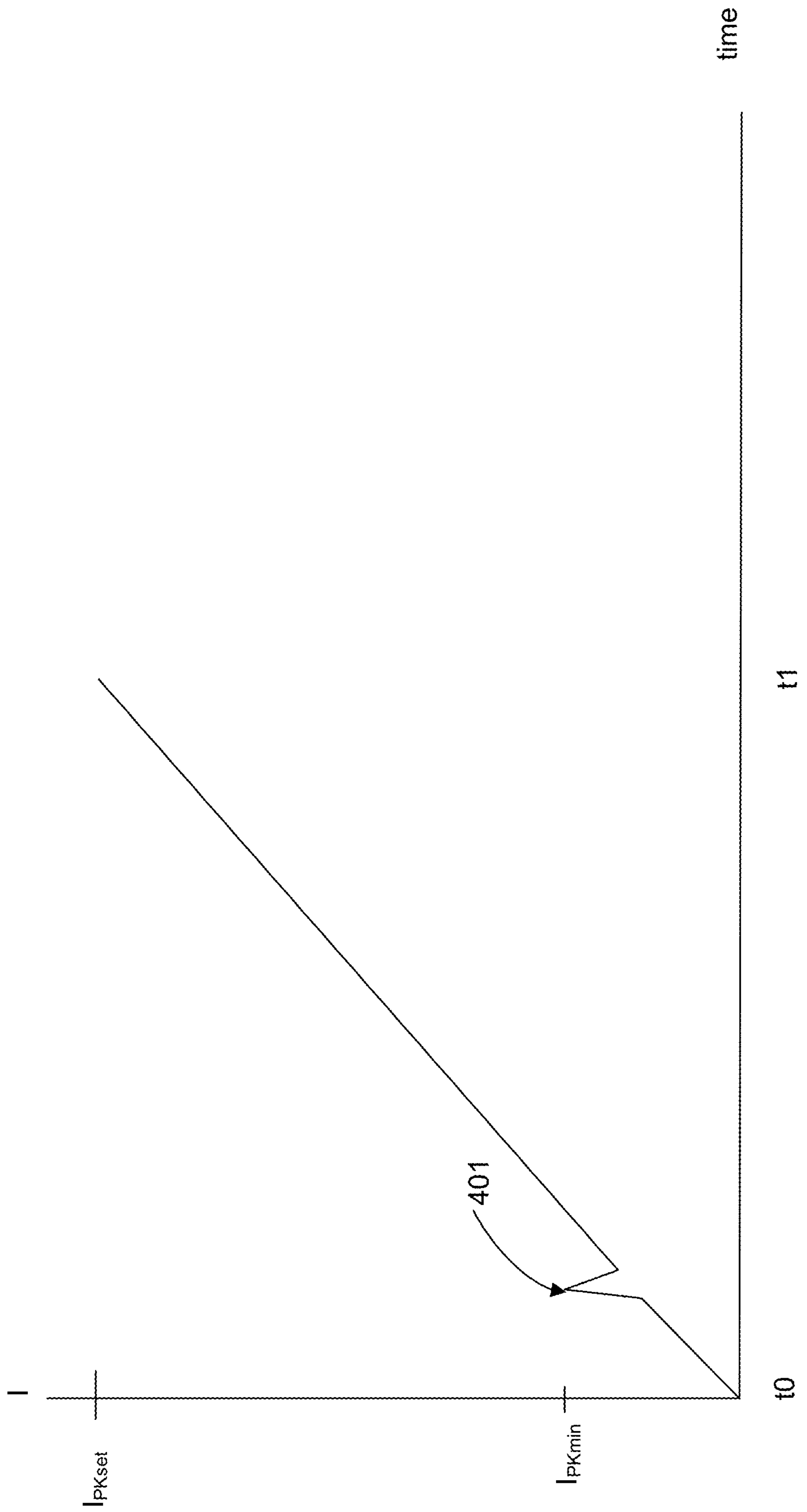
FIG. 4 is a graphical illustration of another exemplary current at node $I_{PK}$ in FIG. 2 in accordance with embodiments.

As noted above, there is a limit to how low the dimming level can be set using only the analog dimming technique. Specifically, as is known in the related arts, MOSFETs have a capacitance between the gate terminal and the source terminal, known as the Miller capacitance. Due to that Miller capacitance, the perfect triangular waveform shown in FIG. 3 is very difficult to achieve. Particularly, referring now to the graph of FIG. 4, due to Miller capacitance, shortly after the MOSFET turns on, there is a blip 401 in the current through the source and drain of the MOSFET as it is ramping up. Thus, $I_{PK}$ cannot be set to a value below the peak of that blip 401 because, if it were, the microprocessor would turn off the MOSFET in response to the blip, rather than at the desired current level, $I_{PKset}$.

Thus, a second type of dimming, i.e., PWM duty cycle control dimming, may be implemented in combination with the aforedescribed analog dimming technique to, among other things, allow dimming down to lower levels.

Figure 5:
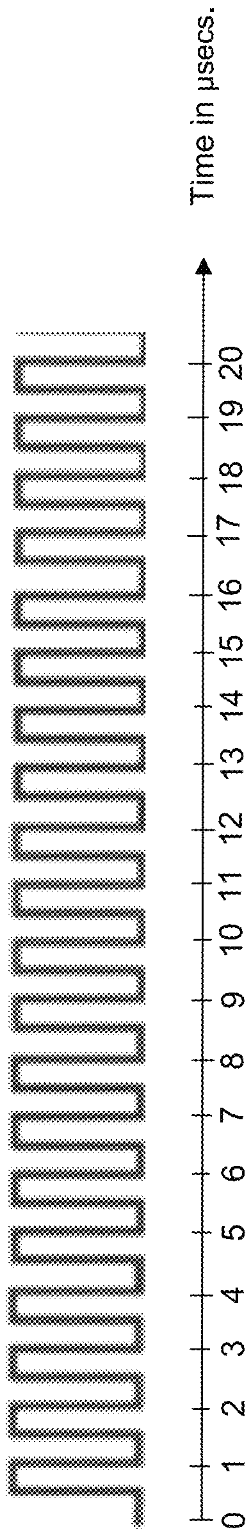
FIG. 5 is a graphical illustration of a high frequency pulse train signal that may be placed at the gate of the MOSFET in FIG. 2 in accordance with embodiments.

In accordance with this PWM duty cycle control dimming technique, the control signal at the gate of the MOSFET is gated on and off at a particular duty cycle to achieve additional dimming by further reducing the average current through the LED string. Specifically, it should be apparent that the waveform provided by the microprocessor at the gate terminal of the MOSFET is a pulse string such as illustrated by FIG. 5. The frequency of the pulse string would be essentially the same as the frequency of the triangular waveform shown in FIG. 3. Thus, as noted in connection with FIG. 3, as $I_{PKset}$ increases, the frequency of the pulses in FIG. 5 will decrease, and, as $I_{PKset}$ decreases, the frequency of the pulses in FIG. 5 will increase.

For purposes of clarity and distinguishing from the signals discussed below in connection with PWM dimming that also comprise pulse trains, the pulse waveform generated by the microprocessor at the gate of the MOSFET 205 such as illustrated in FIG. 5 will herein be referred to as the analog dimming pulse train and/or high frequency pulse train and its frequency will be referred as the analog dimming pulse train frequency (because, as will become clear from the discussion below, the PWM pulse train will be at a lower frequency).

In accordance with this PWM dimming technique (herein called the PWM duty cycle control dimming technique, as previously noted), the analog dimming pulse train (i.e., the high frequency pulse train of FIG. 5) that the microprocessor places at the gate of MOSFET 205 is gated at a specific duty cycle to achieve additional dimming.

More specifically, let us assume that the frequency of the analog dimming pulse train at the gate of the MOSFET (i.e., in FIG. 5) is 1 MHZ (corresponding to a periodicity of 1 μsec per cycle/pulse).

Figure 6:
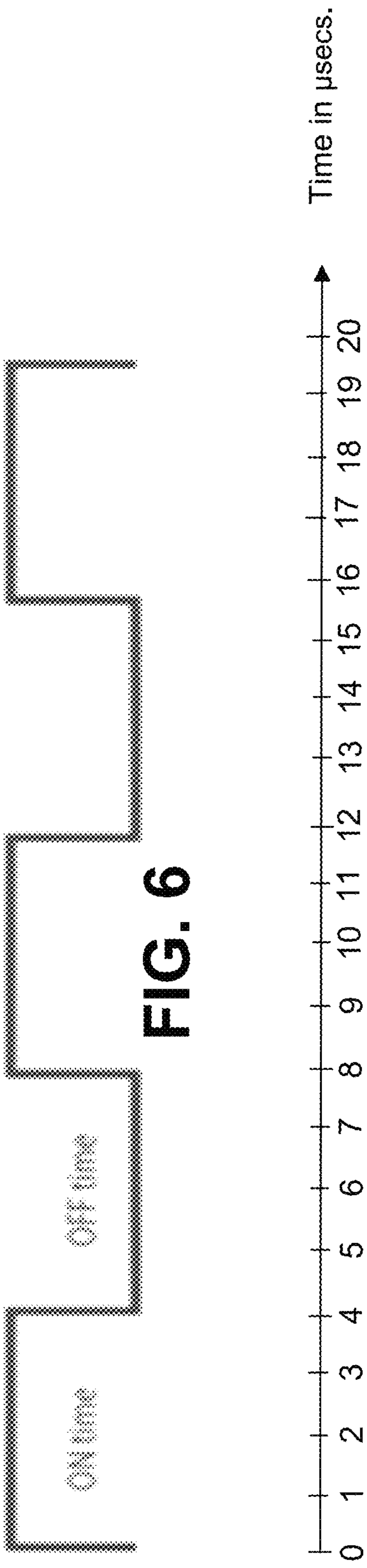
FIG. 6 is a graphical illustration of an exemplary PWM gating signal that may be applied to the high frequency pulse train of FIG. 5 at the gate of the MOSFET in FIG. 2 in accordance with embodiments.
Figure 7:
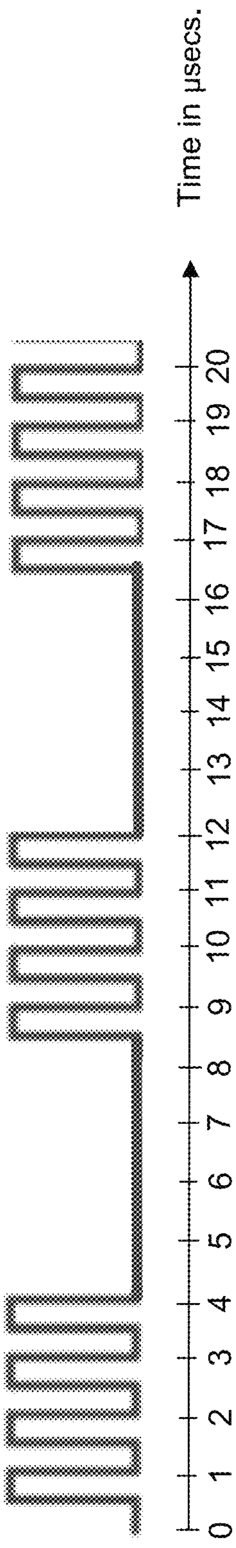
FIG. 7 is a graphical illustration of an exemplary signal at the gate of the MOSFET of FIG. 2 resulting from a combination of the signals in FIGS. 5 and 6 in accordance with embodiments.

In accordance with this PWM duty cycle control dimming technique, the analog dimming pulse train of FIG. 5 is turned on and off at a PWM switching frequency that is lower than the 1 MHz frequency of the analog dimming pulse train of FIG. 5. For example, referring to FIG. 6, if the PWM switching frequency is set to 125 KHz (i.e., a periodicity of 1/125,000=8 μsecs per cycle/pulse) and it was pulsed at a 50% duty cycle (on for half of each cycle and off for half of each cycle), then the waveform at the gate of the MOSFET 205 would be as shown in FIG. 7, i.e., 4 μsecs of 1 MHz pulses (which is four pulses), followed by 4 μsecs of the 1 MHz pulses being off, followed by four more 1 MHz pulses, followed by 4 μsecs of the 1 MHz pulses being off, and so on.

Thus, the dimming level would be further cut in half from whatever dimming level was achieved by the analog dimming technique because the average current through the LED string would now be half of what it was before applying the PWM gating to the high frequency analog dimming pulse train at the gate of the MOSFET.

The duty cycle of the PWM switching signal may be adjusted to achieve varying levels of dimming. For instance, altering the PWM switching signal to a duty cycle of one quarter will cut the dimming level even further to one quarter of the level established by the analog dimming, and altering the PWM dimming signal to a duty cycle of one eighth will cut the dimming level even further to one eighth of the level established by the analog dimming alone, and so on.

In one practical embodiment for achieving this gating of the high frequency analog dimming pulse train, the microprocessor 225 uses a counter to count the number of high frequency analog dimming pulses and is programmed to suppress the analog dimming pulses from the gate terminal of the MOSFET when the count during the ON period reaches a first specified number and then to turn them back on at the gate of the MOSFET when the count of pulses during the OFF period reaches a second specified number. For instance, continuing with the example of the high frequency analog dimming pulses at 1 MHz and the PWM switching frequency of 125 KHz, then, for a 25% duty cycle, the first number would be 25% of the number of 1 μsec (i.e., 1 MHZ) analog dimming pulses that fit into each 8 μsecs (i.e., 125 KHz) cycle, i.e., 25% of 8 pulses, which is 2 pulses, and the second number would be 75% of the number of 1 μsec (i.e., 1 MHZ) pulses that fit in one 8 μsecs (i.e., 125 KHz) cycle, i.e., 6 pulses.

In this example, since the lowest possible number that the ON count can be set to is 1 pulse (and, thus, the OFF count would be 15), the lowest level of additional dimming that could be achieved by this PWM dimming technique would be limited one sixteenth (or 12.5%) of the set analog dimming level.

Thus, as a practical matter, the lower the PWM switching frequency, the lower the dimming level that can be achieved via this PWM dimming technique (because, as the frequency of the PWM switching signal decreases, the greater the number of 1 MHz high frequency analog dimming pulses can fit within each cycle of the PWM dimming signal, and, thus, the smaller the percentage of that PWM switching cycle that is consumed by one such analog dimming pulse).

PWM Frequency Control Dimming Technique

However, there are limits to how low the PWM switching frequency can be set. Particularly, at or below 1.25 KHz switching, flicker would become noticeable to the human eye, which is undesirable. Thus, the minimum possible PWM switching frequency should be set to a value higher than (and preferably much higher than) 1.25 KHz.

Thus, in one set of embodiments, a second PWM dimming technique may be employed on top of the first PWM dimming technique and analog dimming technique. However, as will become clear in the discussion below, this second PWM dimming technique may further limit the minimum practical nominal PWM switching frequency to a value even higher than 1.25 KHz. In this context, "nominal" PWM dimming frequency refers to the frequency of the PWM dimming signal before this second PWM dimming technique is implemented.

Despite this additional limitation on the nominal PWM switching frequency, combining this second PWM frequency control dimming technique (to be described below) with both the aforedescribed analog dimming technique and PWM duty cycle control dimming technique, actually allows for even lower dimming levels; as low as 0.01%.

In accordance with this second PWM frequency control dimming technique (herein termed PWM frequency control dimming, as previously noted), the OFF count of the high frequency pulses is increased, as needed, independently of the ON count of high frequency pulses. Increasing the OFF count of high frequency pulses needed to turn the high frequency pulses back on at the gate of the MOSFET is, effectively, a back door way of decreasing the PWM switching frequency. This, of course, increases the number of the high frequency pulses that fit within the cycle period of the PWM switching frequency, which, further in turn, decreases the percentage of the duty cycle thereof that is consumed by one of the high frequency analog dimming pulses, thereby further decreasing the minimum achievable dimming level.

Since this second PWM dimming technique effectively decreases the frequency of the PWM dimming signal, that is why the nominal PWM dimming frequency actually should be set higher than the flicker threshold of 1.25 KHz. Thus, as a practical matter, the nominal frequency of the PWM dimming signal should be set to a frequency such that when the maximum allowed amount of the second PWM dimming technique is applied, the frequency of the PWM dimming signal is still above (and preferably, well above) 1.25 KHz.

In one exemplary embodiment, the nominal frequency of the PWM dimming signal is set to 18 KHz.

One issue for both PWM dimming techniques is the fact discussed above in connection with FIG. 3 that, as the $I_{PKset}$ value (i.e., the value that determines the amount of analog dimming achieved) decreases, the actual frequency of the high frequency analog dimming pulse train increases from the original nominal (e.g., 1 MHZ) frequency. This variance in the frequency of the high frequency pulses must be taken into account in both of the PWM dimming techniques because both techniques rely on counting the high frequency pulses in order to achieve accuracy in the level of additional dimming provided by those two techniques. If those pulses are not, in fact, at a frequency of 1 MHZ, then the exact level of additional dimming achieved by either of the PWM dimming techniques will not be linear. For example, if dimming is set via a 16 bit Analog-to-Digital Converter (ADC), then, in theory, the user has up to 65,536 distinct possible dimming settings. It is desirable to make all of those possible dimming settings linearly related, i.e., each single increment in the dimming setting equates to a change in illumination equal to $1/65{,}536^{th}$ of the full dimming range.

Thus, when determining how many ON pulses to count before turning the signal to the gate of the MOSFET off and how may OFF pulses to count before turning the signal to the gate of the MOSFET back on, it is crucial to know the frequency of those pulses so that those ON and OFF counts can be adjusted accordingly to achieve linear dimming.

Unfortunately, the relationship between $I_{PKset}$ and the frequency of the high frequency pulses may not be linear, and, therefore, may not be easily compensated for using a simple scaling factor because it depends on many factors, including circuit component tolerances, temperature, etc. Thus, it may be difficult to define an equation for the frequency of the high frequency pulse train as a function of $I_{PKset}$.

In one solution for this issue, the relationship of the frequency of the high frequency pulse train to $I_{PKset}$ may be determined empirically by measuring that frequency as a function of $I_{PKset}$. In one particular embodiment, this empirical data may be collected by setting the values of the circuit components in FIG. 2 and then measuring the frequency of the high frequency pulse train for each different lighting device (device string) that the circuit is intended for use with. In one such embodiment, the measurements may be taken at room temperature. However, in other more robust embodiments, the measurements may be taken at a plurality of operating temperatures.

The empirical data may be stored in a look up table that the microprocessor consults to determine the frequency of the high frequency pulses as a function of $I_{PKset}$. However, this may be very memory intensive (particularly, if there are multiple data sets for different temperatures) and could be impractical in some cases. Therefore, if a reasonably accurate approximation of the empirical data can be formulated into an equation, the microprocessor may be programmed to use such an equation to determine the frequency of the high frequency pulse train as a function of $I_{PKset}$.

Merely as one example, FIG. 8 is a graph plotting the empirically collected data for $I_{PKset}$ versus frequency over the full range of possible $I_{PK}$ values for one particular circuit specification for one particular light string. In the example of FIG. 8, $I_{PK}$ can range from a high (i.e., no analog dimming applied) of 180 mA to a low of 40 mA (not 0 mA because of the aforementioned Miller capacitance effect limiting the lower current limit for analog dimming). The plot of the empirically collected data is shown at 811. As can be seen, the data shows that the relationship is almost linear. Therefore, it would be reasonable to use a linear equation to approximate the frequency of the high frequency pulses as a function of $I_{PKset}$. The linear approximation is shown at 821 in FIG. 8. The equation describing this function is:

$$\text{Frequency of high frequency pulse train}=(-8995.4*I_{PKset})+2{,}600{,}000\ \text{Hz}$$

Example Embodiments

The three techniques may be applied in any mixture. For instance, in a simple implementation, the three techniques may be applied to their fullest extent in a given order. For instance, the PWM duty cycle control dimming technique may be applied from full power down to the minimum dimming level achievable using only that technique. Then to achieve even lower dimming levels, the microprocessor may start applying the PWM frequency control dimming technique on top of the PWM duty cycle control dimming technique. Then, when the lower limit of the combination of those two techniques is reached, the analog dimming technique may be applied.

In other embodiments, 11 or instance, one may apply the PWM duty cycle control dimming technique down to 50% dimming level, then start applying the analog dimming technique down to 5% dimming level, then start increasing the use of the PWM duty cycle control dimming technique again down to 1% dimming level, and, then, only below 1% dimming level start applying the PWM frequency control dimming technique.

Dimming down to extremely low dim levels (e.g., 0.01%) are achievable with the above-described system. For instance, let us consider the system described above employing a nominal frequency of the high frequency pulse train of 1 MHZ (i.e., 1 MHz when no analog dimming is applied, i.e., when $I_{PKset}$ is set to $I_{PKmax}$), a nominal PWM switching frequency of 18 KHz, an $I_{PKmax}$ of 180 mA, and an $I_{PKmin}$ of 40 mA.

At these frequencies, applying only the PWM duty cycle control dimming technique, dimming can be achieved down to about 1.8% dimming level. Particularly, at 1 MHz, the high frequency pulse train has a period of 1/1 MHz=1μ. At 18 KHz, the PWM control signal has a period of 1/18 KHz=55 μsec. Thus 55 high frequency pulses can fit in one PWM control signal cycle.

Accordingly, since the lowest ON pulse count that is achievable is one pulse, the minimum dimming that can be achieved using only the PWM duty cycle dimming technique is 1/55=0.018 or 1.8% dimming.

If we then start applying the PWM frequency control dimming technique to take the frequency of the PWM control signal down to 1.25 KHz (the minimum if flicker is to be avoided), we now have a PWM control signal period of 1/1.25 KHz=800 μsec. Thus, we now have 800 1 MHz pulses that can fit within one PWM control signal cycle. Thus, the minimum dimming that can be achieved using a combination of both PWM dimming technique is 1/800=0.00125 or 0.125% dimming.

Finally if we then start to apply the analog dimming technique to take the amplitude of the high frequency pulse train from 180 mA down to 40 mA (i.e., 22% of max), that 0.125% dimming is cut down to 0.125×0.22=0.0275% dimming.

However, recall that, at these very low amplitudes, the frequency of the high frequency pulse train is not actually the nominal frequency (1 MHz in this example), but actually is a much higher frequency, e.g., almost 2.5 MHZ, as shown in FIG. 8, which has a period of 0.4 μsec, rather than the 1.0 μsec used in the calculations above.

Thus, in fact, with a high frequency pulse train at, e.g., 2.5 MHZ (i.e., a period of 0.4 μsec rather than 1 μsec), the actual dimming level achievable is 0.4/1.0=40% of the above calculated 0.0275%, i.e., 0.0275×0.4=0.011%.

With this design, a single dimming system may be designed to be usable with many different light strings, e.g., all of the circuit components on a Printed Circuit Board (PCB) remain the same. This would be very economically efficient because one PCB design could be used for many different lighting devices, the only difference being different programming of the microprocessor for each different light string.

Figure 9:
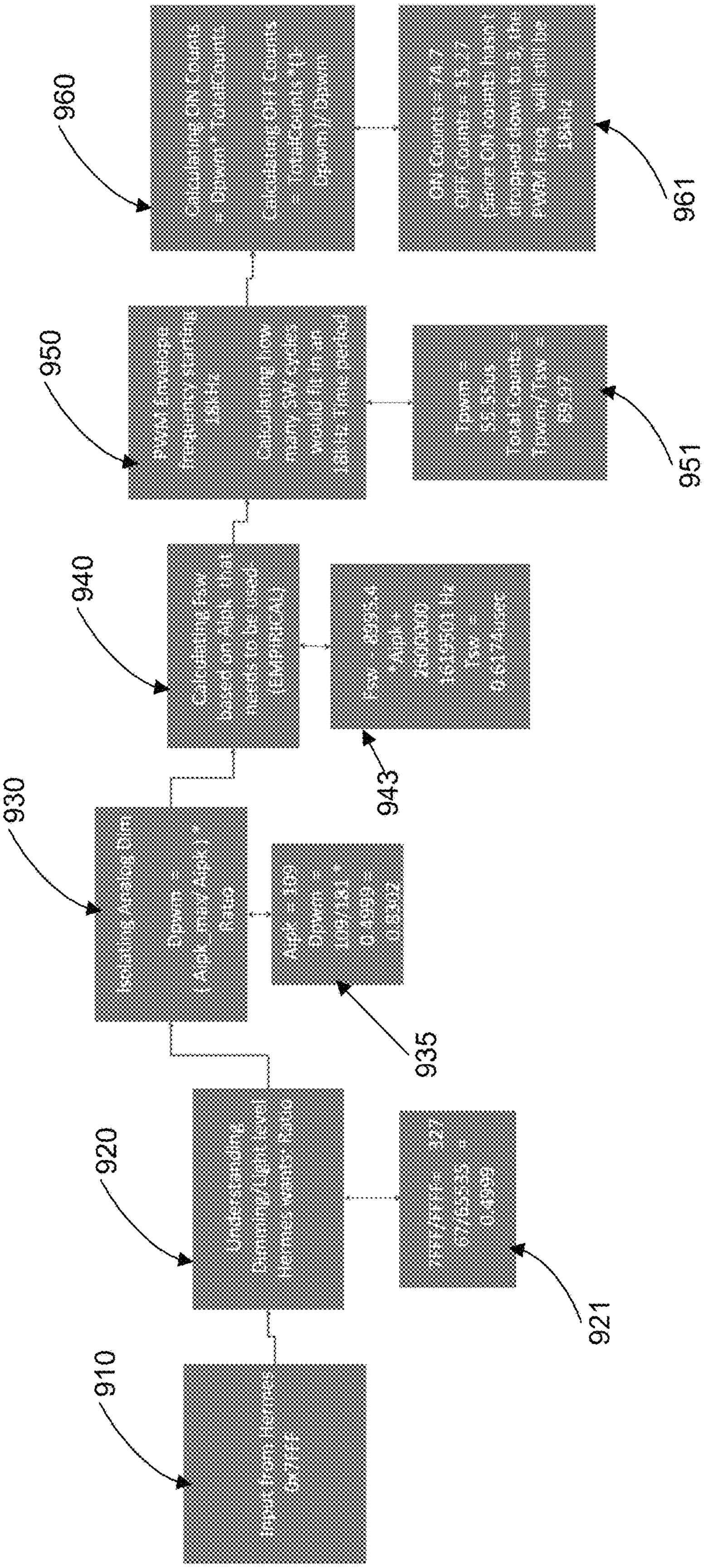
FIG. 9 is a flowchart demonstrating operation of a dimming control circuit in accordance with embodiments in accordance with a first example.
Figure 10:
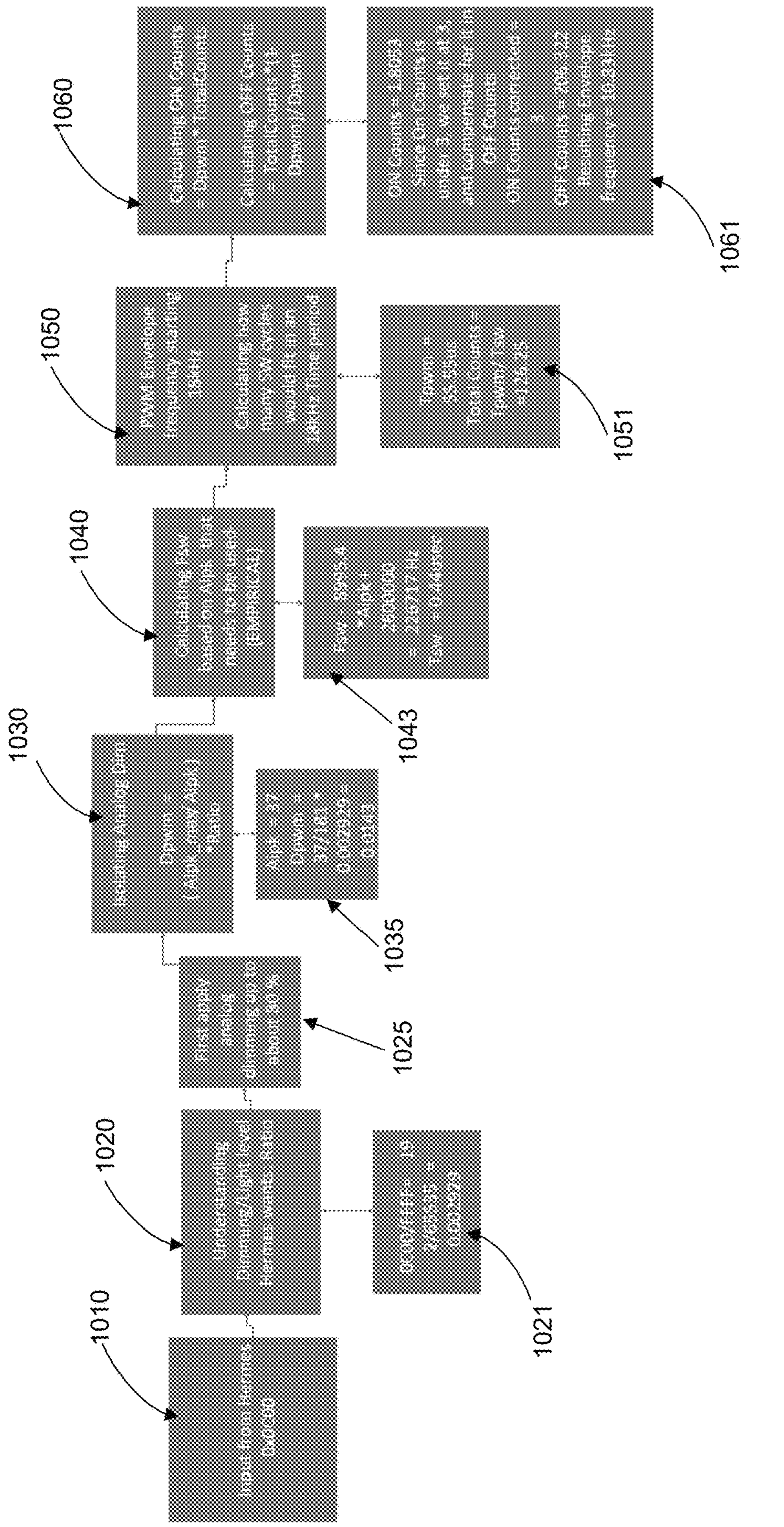
FIG. 10 is a flowchart demonstrating operation of a dimming control circuit in accordance with embodiments in accordance with a second example.

FIGS. 9 and 10 are flowcharts illustrating two examples of process flow in accordance with two different dimming settings selected by a user.

In FIG. 9, flow starts at 910 when a user enters a desired dimming level of 50%. In this example, the user interfaces with a device that uses a 16 bit Analog-to-Digital Converter (ADC) that outputs the user's dimming level selection to the microprocessor 225 as a hexadecimal value between 0001 and FFFF, theoretically allowing 65,536−1=65,535 different possible dimming levels. Thus, in response, the microprocessor 225 receives the binary code of 7FFF (hexadecimal) indicating the desired dimming level. At 920, the microprocessor interprets that value to a dimming level that it understands, as shown at 921, by dividing that value by the maximum value to determine that a dimming level of 0.4999 (or 49.99%) is desired.

Next, at 930, the microprocessor determines if the analog dimming value is set to something less than full power and, if so, adjusts the ratio calculated in steps 920 and 921 to a new duty cycle ratio, $D_{PWM}$, to compensate for any analog dimming. This step is placed here, not necessarily because analog dimming is applied first before the PWM dimming techniques per se, but because, as noted above, the dimming system may be designed to work with a multiplicity of different light strings, some of which may have a maximum allowable peak current, $I_{PKmax}$, that is less than the maximum peak current that the microprocessor is programmed to handle. Thus, for instance, the microprocessor may be programmed to handle a peak current of up to 180 mA. However, if it is connected to a light string that actually can only handle 109 mA, then the peak current may be set to 109 mA before any analog dimming is applied, rather than 180 mA, in which case the ratio calculated in steps 920 and 921 must first be adjusted responsive to the maximum peak current, $I_{PKmax}$, actually being 109 mA, rather than 180 mA.

Thus, as shown at 935, the ratio determined in steps 920 and 921 is multiplied by the ratio of the maximum $I_{PK}$ that the microprocessor is programmed to handle and the actual $I_{PK}$ to which it is currently set.

In this example, the light string can handle a maximum $I_{PK}$ of 109 mA, rather than the 180 mA that may be possible with other light strings. Thus, in step 930, the 0.4999 ratio calculated in steps 920 and 921 is multiplied by the ratio of the maximum programmable $I_{PK}$ (e.g., 180 mA) divided by the actual $I_{PK}$ (e.g., 109 mA). Thus, as shown at 935, the PWM nominal duty cycle, $D_{PWM}$, is adjusted from 0.4999 to:

$$D_{PWM} = 181/109 * 0.4999 = 0.8302$$

Now, in step 940, the actual frequency (and/or cycle period) of the high frequency pulse train is determined based on the empirical data for that frequency as a function of $I_{PK}$ that was previously collected and programmed into the microprocessor (as discussed above in connection with FIG. 8). For ease of reference, in 935, we use the actual data illustrated in FIG. 8 as an example, i.e., frequency of high frequency pulse train=(−8995.4*$I_{PKset}$)+2,600,000 Hz. This yields a determined frequency for the high frequency analog dimming pulse train of:

$$(-8995.4 * 109) + 2{,}600{,}000 = 1{,}619{,}501 \text{ Hz}$$

which converts to a cycle period of:

$$\text{Cycle Period} = 1/1{,}619{,}501 \text{ Hz} = 0.617 \ \mu\text{sec}$$

Next, at step 950, the microprocessor calculates how many of the high frequency pulses at 1,619,510 Hz fit within one cycle of the 18 KHz PWM switching cycle. As shown at 951, this is simply the ratio of the two frequencies (or conversely the ratio of the two cycle periods), i.e.:

$T_{PWM}$=1,619,510 Hz/18000 Hz=89.97 high frequency pulses per PWM switching cycle, or, alternately, $T_{PWM}$=55.5 µsec/0.617 µsec=89.97 high frequency pulses per PWM switching cycle.

Finally, at step 960, the number of ON pulse counts and OFF pulse counts for the PWM duty cycle control dimming technique are calculated. The calculation of the ON count is simply the duty cycle ratio calculated in step 930, $D_{PWM}$, multiplied by the total number of counts in a PWM switching cycle, $T_{PWM}$, calculated in step 950 and then rounded to the nearest integer value, i.e.;

$$\text{ON Count} = 0.8302 * 89.97 = 74.7 \text{ (rounded to 75 ON counts)}$$

The OFF count is simply the total number of counts per PWM switching cycle, $T_{PWM}$, calculated in step 950 minus the ON count, i.e.:

$$\text{OFF Count} = 89.97 - 74.7 = 15.27 \text{ (rounded to 15 OFF counts)}$$

Thus, in the exemplary flowchart of FIG. 9, only PWM duty cycle dimming was needed to achieve the selected dimming level of 50%.

The flowchart of FIG. 10 shows another example in which all three dimming techniques are used in combination to achieve a very low dimming level of 2.9%. Steps 1010, 1020, 1021, 1030, 1035, 1040, 1043, 1050, and 1051 are substantially similar to steps 910, 920, 921, 930, 935, 940, 943, 950, and 951 of FIG. 9 except as noted below.

Thus, at 1010, a user enters a desired dimming level of 2.9% into the system, which is received by the microprocessor 225 as an input of 0C00 hexadecimal. Thus, in response, the microprocessor 225 receives the code 0C00 (hexadecimal) indicating the desired dimming level. At 1020, the microprocessor, interprets that value by dividing the received value by the maximum value as shown at 1021 to determine that a dimming level of 0.29% is desired (i.e., dimmed 99.71%).

Let us assume, for example, that the microprocessor is configured to first apply analog dimming down to about a 20% dimming level, if the user-selected dimming level is below 5%. Thus, next, at step 1025, the microprocessor decides to apply analog dimming by reducing the peak current, $I_{PKset}$, to 20% of the full power of 180 mA, namely, 37 milliamps.

At 1030, the microprocessor determines if the analog dimming value is set to something less than full power and, if so, adjusts the ratio calculated in steps 1020 and 1021 to a new duty cycle ratio, $D_{PWM}$, to compensate for any such analog dimming. Thus, as shown at 1035, the ratio determined in steps 1020 and 1021 is multiplied by the ratio of $I_{PKmax}$ that the microprocessor is programmed to handle and the actual $I_{PKset}$.

In this example, $I_{PKset}$ is set to 37 mA. Thus, in step 1030, the 0.029 ratio calculated in steps 1020 and 1021 is multiplied by the ratio of the maximum programmable $I_{PK}$ (e.g., 180 mA) divided by the actual $I_{PKset}$ (e.g., 37 mA). Thus, as shown at 1035, the PWM nominal duty cycle, $D_{PWM}$, is set to:

$$D_{PWM} = 181/37 * 0.029 = 0.0143$$

Now, in step 1040, the actual frequency (and/or cycle period) of the high frequency pulse train is determined based on the empirical data for that frequency as a function of $I_{PK}$ that was previously collected and programmed into the microprocessor (as discussed above in connection with FIG. 8). Thus, using the equation derived from the data from FIG. 8, this yields a determined frequency for the high frequency pulse, $F_{SW}$, train of:

$$F_{SW} = (-8995.4 * 109) + 2{,}600{,}000 = 2{,}267{,}170 \text{ Hz}$$

which converts to a cycle period of:

$$\text{Cycle Period} = 1/2{,}267{,}170 \text{ Hz} = 0.44 \ \mu\text{sec}$$

Next, at step 1050, the microprocessor calculates how many of the high frequency pulses at 2,267, 170 Hz fit within one cycle of the 18 KHz nominal PWM switching cycle. As shown at 1051, this is simply the ratio of the two frequencies (or conversely the ratio of the two cycle periods), i.e.:

$T_{PWM}$=2,267,170 Hz/18000 Hz=126.25 high frequency pulses per PWM switching cycle, or, alternately, $$T_{PWM} = 55.5\ \mu\text{sec}/0.44\ \mu\text{sec} = 126.25 \text{ high frequency pulses per } PMW \text{ switching cycle.}$$

Finally, at step 1060, the number of ON pulse counts and OFF pulse counts for the PWM duty cycle control dimming technique are calculated. The calculation of the ON count is simply the duty cycle ratio calculated in step 1030, $D_{PWM}$, multiplied by the total number of counts per PWM switching cycle, $T_{PWM}$, calculated in step 1050 and then rounded to the nearest integer value, i.e.;

$$\text{ON Count} = 0.0143 * 126.25 = 1.80537 \text{ ON Counts}$$

The OFF count is simply the total number of counts per PWM switching cycle, TPWM, calculated in step 1050 minus the ON count:

$$\text{OFF Count} = 126.25 - 1.8053 = 124.45$$

As discussed above, normally, as long as the number of ON Counts from this calculation is greater than 1, it might not be necessary to apply the PWM frequency control dimming technique to achieve the desired 0.29% dimming. However, another potential issue when dimming to very low levels may be exposed here. Particularly, at very low dimming levels, there may not be enough current to fully charge capacitor 247 with one pulse (or even a few pulses) of the high frequency pulse train, which could cause the circuit of FIG. 2 to not operate as intended.

Thus, for purposes of illustrating both the PWM frequency control dimming technique and this capacitance issue, let us assume that the circuit requires there to be at least three of the high frequency pulses in the ON count for the circuit to operate as intended. In this case, in step 1060, the microprocessor determines that the calculated ON count is below the required minimum threshold of 3 counts. Therefore, it sets the ON count to three and adjusts the OFF Count of the PWM control signal using the PWM frequency control dimming technique to compensate for this adjustment to the ON count in order to keep the duty cycle at the desired duty cycle. This adjustment comprises multiplying the OFF count calculated above by the ratio of 3 (the minimum allowable ON pulse count) to 1.80537 (the ON count calculated above), i.e.:

$$\text{Adjusted OFF Count} = 124.45 * (3/1.80537) = 206.79 \text{ OFF Counts}$$

This adjustment lowers the frequency of the PWM dimming control signal from the nominal 18 KHz to 10.83 KHz, i.e.:

$$F_{SW} = 18 \text{ KHz} * (126.25 \text{ counts per cycle}/(206.79 + 3) \text{ counts per cycle} = 10.83 \text{ KHz}$$

Thus, in the exemplary flowchart of FIG. 10, all three dimming techniques were employed to achieve a very low dimming level of 0.29%.

CONCLUSION

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs).

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of circuit diagrams, block diagrams, flowcharts, and/or examples. Insofar as such circuit diagrams, block diagrams, flowcharts, and/or examples contain one or more functions and/or operations, it will be understood by those within the art that each function and/or operation within such circuit diagrams, block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

The invention claimed is:

1. A circuit for dimming of a lighting device, the circuit comprising:

a transistor comprising a gate terminal, a source terminal, and a drain terminal;

an inductor having a first terminal coupled to the drain terminal of the transistor at a first node and a second terminal coupled to a first terminal of the lighting device;

a resistor having a first terminal coupled to the source terminal of the transistor;

a processing device coupled to the gate terminal of the transistor, the processing device configured to detect a voltage at the first node and to provide a voltage at the gate terminal of the transistor that turns the transistor on when it detects that the voltage at the first node is zero volts, the processing device further configured to detect a current through the resistor and configured to provide a voltage at the gate of the transistor that turns the transistor off when it detects the current through the resistor is above a threshold current level, thereby producing a pulse train having a first frequency at the gate of the transistor; and wherein the processing device is further configured to cyclically enable the pulse train at the gate of the transistor for a first period and disable the pulse train at the gate of the transistor for a second period thereby turning the pulse train on and off at the gate of the transistor at a duty cycle determined by the first period and the second period and at a second frequency lower than the first frequency.

2. The circuit of claim 1 wherein the transistor is a MOSFET transistor.

3. The circuit of claim 2 wherein the threshold current level is configurable to a plurality of different current levels to achieve different levels of dimming of the lighting device.

4. The circuit of claim 3 wherein the threshold current level dictates, at least in part, an average current through the lighting device.

5. The circuit of claim 4 wherein the duty cycle is configurable to a plurality of different duty cycles to achieve different levels of dimming of the lighting device.

6. The circuit of claim 5 wherein the duty cycle dictates, at least in part, the average current through the lighting device.

7. The circuit of claim 6 wherein the processing device is configured to count the pulses in the pulse train and to disable the pulse train when it counts a first number of pulses after the pulse train was enabled and to enable the pulse train when a second number of pulses is counted after the pulse train was disabled, whereby the first period and the second period, and thus, the duty cycle, are dictated by the first and second numbers of pulses.

8. The circuit of claim 7 wherein the first and second numbers of pulses are configurable to a plurality of different counts to achieve different levels of dimming of the lighting device.

9. The circuit of claim 8 wherein the processing device is configured to increase dimming by first reducing the first number of pulses to a predetermined minimum count while commensurately increasing the second number of counts, whereby the second frequency remains constant and, when the predetermined minimum first number of counts is reached, to further increase dimming by increasing the second number of counts without further decreasing the first number of counts, whereby the second frequency is decreased.

10. The circuit of claim 9 further comprising an RC filter coupled across the resistor.

11. The circuit of claim 10 further comprising a capacitor coupled between the second terminal of the inductor and a fixed voltage.

12. The circuit of claim 11 further comprising a bleeder resistor coupled in parallel with the capacitor.

13. A method of controlling dimming of a lighting device comprising:

controlling an average current through the lighting device by a combination of:

applying analog dimming by passing a first signal comprising a periodic current at a first frequency through the lighting device, wherein dimming is achieved by controlling the peak current of the first signal;

applying first Pulse Width Modulation (PWM) dimming by modulating the first signal ON and OFF with a second signal at a pulse frequency lower than the first frequency, wherein additional dimming is achieved by controlling a duty cycle of the second signal; and applying second PWM dimming by further increasing the off period of the second signal per cycle to reduce the pulse frequency of the second signal.

14. The method of claim 13 wherein the additional dimming is achieved using the first PWM dimming down to a predetermined minimum ON period per cycle and, wherein the second PWM dimming is employed when the first PWM dimming is operating at the predetermined minimum ON period.

15. The method of claim 13 wherein the lighting device is coupled to a transistor through an inductor and wherein the analog dimming comprises controlling the transistor with a pulse train that turns the transistor on responsive to a voltage across the inductor reaching zero and turning the transistor off responsive to a current through the transistor reaching a predetermined level.

16. The method of claim 15 wherein the periodic current has a triangular waveform.

17. The method of claim 16 wherein a level of analog dimming is controlled as a function of the predetermined current level.

18. The method of claim 17 wherein the first PWM dimming comprises counting the pulses in the pulse train and disabling the pulse train when a first number of pulses in the pulse train is counted after the pulse train was enabled and enabling the pulse train when a second number of pulses is counted after the pulse train was disabled, wherein the sum of the first number of pulses and the second number of pulses remains constant to control the duty cycle of the second signal while the frequency of the second signal remains constant.

19. The method of claim 18 wherein the second PWM dimming comprises increasing the second number of pulses without changing the first number of pulses, whereby the frequency of the second signal is decreased.

20. A method of controlling dimming of a lighting device comprising:

controlling an average current through the lighting device by a combination of:

applying analog dimming by passing a first signal comprising a periodic current at a first frequency through the lighting device, wherein dimming is achieved by controlling the peak current of the first signal;

applying first Pulse Width Modulation (PWM) dimming by modulating the first signal ON and OFF with a second signal at a pulse frequency lower than the first frequency, wherein additional dimming is achieved by controlling a duty cycle of the second signal down to a predetermined minimum ON period per cycle; and after the predetermined minimum ON period in the first PWM dimming is reached, applying second PWM dimming by further increasing the off period of the second signal per cycle to reduce the pulse frequency of the second signal.

* * * * *